United States Patent [19]

Bown et al.

[11] Patent Number: 5,244,542
[45] Date of Patent: Sep. 14, 1993

[54] AQUEOUS SUSPENSIONS OF CALCIUM-CONTAINING FILLERS

[75] Inventors: Richard Bown, St. Austell; Pamela G. Pownall, Par, both of United Kingdom

[73] Assignee: ECC International Limited, Great Britain

[21] Appl. No.: 844,902

[22] Filed: Mar. 2, 1992

Related U.S. Application Data

[63] Continuation of Ser. No. 613,447, Nov. 13, 1990, abandoned, which is a continuation of Ser. No. 398,289, Aug. 22, 1989, abandoned, which is a continuation of Ser. No. 146,961, Jan. 22, 1988, abandoned.

[30] Foreign Application Priority Data

Jan. 23, 1987 [GB] United Kingdom ............... 8701491

[51] Int. Cl.$^5$ .............................. D21H 17/69
[52] U.S. Cl. .............................. 162/164.3; 162/164.6; 162/168.1; 162/168.2; 162/181.2; 162/183
[58] Field of Search ............... 162/181.2, 181.3, 183, 162/168.1, 168.2, 168.3, 164.6, 164.3

[56] References Cited

U.S. PATENT DOCUMENTS

| | | | |
|---|---|---|---|
| 4,282,059 | 8/1981 | Davidson | 162/181.8 |
| 4,610,801 | 9/1986 | Matthews et al. | 162/181.2 |

FOREIGN PATENT DOCUMENTS

| | | |
|---|---|---|
| 3608614 | 9/1986 | Fed. Rep. of Germany . |
| 3608637 | 9/1986 | Fed. Rep. of Germany . |
| 446201 | 8/1981 | Sweden . |
| 1163842 | 9/1969 | United Kingdom . |
| 1505641 | 3/1978 | United Kingdom . |
| 2185045 | 7/1987 | United Kingdom . |

OTHER PUBLICATIONS

Paper Trade Journal, "Paper Mill Chemistry: Analyzing Use of Neutral Sizing and Calcium Carbonate in Paper", by Hugh R. Bryson, dated Oct. 15–31, 1978.

Primary Examiner—Peter Chin
Attorney, Agent, or Firm—Klauber & Jackson

[57] ABSTRACT

There is disclosed an aqueous suspension of a particulate calcium-containing filler in which the particles of filler are surface treated with a dispersing agent comprising an anionic polyelectrolyte, characterized in that said dispersing agent further comprises sufficient of a cationic polyelectrolyte to render the particles cationic. The aqueous suspension is useful in the manufacture of paper.

4 Claims, No Drawings

AQUEOUS SUSPENSIONS OF CALCIUM-CONTAINING FILLERS

This application is a continuation of application Ser. No. 613,447, filed Nov. 13, 1990 abandoned, which is a continuation of Ser. No. 398,289 filed Aug. 22, 1989 abandoned, which is a continuation of Ser. No. 146,961 filed Jan. 22, 1988 abandoned.

This invention relates to aqueous suspensions of particulate calcium-containing fillers such as calcium carbonate, dolomite or calcium sulphate, to a process for preparing them, and to paper-making compositions containing them.

Particles of calcium-containing fillers normally tend to carry a positive charge. For example, pure calcium carbonate in an aqueous suspension open to the atmosphere has a natural pH value of about 8.3. If, however, it is required to form a suspension containing more than about 60% by weight of a calcium-containing filler it is necessary to use a dispersing agent for the filler (see, for example, GB-1204511); and since dispersing agents most commonly used with calcium-containing fillers are negatively charged, this results in the filler bearing an overall negative charge.

For some purposes, it is desirable to form a concentrated aqueous suspension of a particulate calcium-containing filler in which the particles of filler carry a positive charge. For example, when calcium carbonate is to be used as a filler in a paper making composition a cationic retention aid is generally required to bind the particles of calcium carbonate, which carry a negative charge on their surface following treatment with an anionic dispersing agent, to the generally negatively charged cellulosic fibres of the paper pulp. If the calcium carbonate could be provided in the form of a concentrated aqueous suspension of particles carrying a positive charge, the requirement for the cationic retention aid could be reduced or even eliminated.

Cationic dispersing agents are known, for example vinyl polymers containing quaternary ammonium groups; and low viscosity suspensions containing high concentrations (for example about 70% by weight) of calcium carbonate treated with such a cationic dispersing agent can be prepared if gentle agitation, for example hand mixing, is used in preparing the resulting suspension. But if more vigorous agitation is used, the viscosity of the suspension is found to be unacceptably high.

It is an object of this invention is to provide a concentrated aqueous suspension of a positively charged calcium-containing filler which has low viscosity and which may be prepared using conventional mixing apparatus.

According to a first aspect of the present invention there is provided an aqueous suspension of a particulate calcium-containing filler comprising at least 60% dry weight of the filler, the particles of the filler being dispersed with a dispersing agent comprising an anionic polyelectrolyte, characterised in that the dispersing agent further comprises a cationic polyelectrolyte which is present in a sufficient amount to render the dispersed particles cationic.

Preferably, the aqueous suspension comprises about 80% dry weight of the filler.

According to a second aspect of the present invention there is provided a particulate calcium-containing filler in which the particles of filler are surface treated with a dispersing agent comprising an anionic polyelectrolyte, characterised in that said dispersing agent further comprises sufficient of a cationic polyelectrolyte to render the particles cationic.

The cationic polyelectrolyte is preferably a water-soluble substituted polyolefine containing quaternary ammonium groups. The quaternary ammonium groups may be in the linear polymer chain or may be in branches of the polymer chain. The number average molecular weight of the substituted polyolefine is preferably in the range of from about 1500 to about 500,000 and the quantity required is generally in the range of from about 0.01% to about 1.5% by weight based on the weight of dry calcium-containing filler. It has been found that advantageous results are obtained when the substituted polyolefin is a poly (diallyl di(hydrogen or lower alkyl) ammonium salt) having a number average molecular weight in the range from about 10,000 to 100,000. The lower alkyl groups, which may be the same or different, may for example, have up to four carbon atoms and is preferably methyl. The ammonium salt may be, for example, a chloride, bromide, iodide, $HSO_4^-$, $CH_3SO_4^-$ or nitrite. Preferably the salt is a chloride. Most preferably, the cationic polyelectrolyte is poly (diallyl dimethyl ammonium chloride). Alternatively, the water-soluble substituted polyolefin may be the product of copolymerising epichlorohydrin and an aliphatic secondary amine, said product having the formula

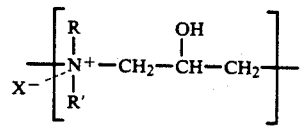

in which R and R', which may be the same or different, are each hydrogen or a lower alkyl group having from one to four carbon atoms, preferably methyl or ethyl and X is $Cl^-$, $Br^-$, $I^-$, $HSO_4^-$, $CH_3SO_4^-$ or nitrite.

The anionic polyelectrolyte is preferably a poly(acrylic acid), a poly(methacrylic acid), a partially sulphonated poly(acrylic acid) or poly(methacrylic acid), or an alkali metal or ammonium salt of any of these acids. The number average molecular weight of the anionic polyelectrolyte is preferably in the range of from about 500 to about 50,000 and the amount used is generally in the range of from about 0.01% to about 0.2% by weight based on the weight of dry calcium carbonate. An especially effective anionic polyelectrolyte is an alkali metal or ammonium salt of a copolymer of acrylic acid and a sulphonic acid derivative of acrylic acid, in which the proportion of the sulphonic acid derivative monomer is preferably from 5% to 20% of the total number of monomer units.

In preferred embodiments of the first aspect of this invention, the ratio of the weight of cationic polyelectrolyte to the weight of anionic polyelectrolyte used is in the range of from 2:1 to 20:1. It has been found that if the calcium carbonate is a ground natural chalk product the weight ratio of cationic polyelectrolyte to anionic polyelectrolyte is preferably about 15:1 and, if the calcium carbonate is ground marble, the weight ratio is preferably about 5:1.

When the aqueous suspension of calcium-containing material is to be used as a filler, the size of the particles is typically predominantly in the range of from 1 to 10 microns. When the filler contains relatively coarse particles, i.e. particles having a diameter larger than about 10 microns equivalent spherical diameter, of a hard mineral the paper or cardboard product tends to become abrasive with consequent water or type face and printing machinery. When the filler contains a high proportion of relatively fine particles, i.e. particles having a diameter smaller than about 1 micron equivalent spherical diameter, the strength of the paper or cardboard product is reduced and in addition unless expensive retention aids are used a proportion of the filler which is added to the cellulosic fibres tends not to be retained in the web of fibres but escapes with the "white water", i.e. the water which drains through the web and through the mesh screen, thus introducing the problem of recovering the mineral particles before the effluent water can be discharged.

According to a third aspect of the present invention there is provided a process for preparing an aqueous suspension of a particulate calcium-containing filler, which process comprises the step of mixing, in aqueous suspension, at least 60% dry weight of the filler and a dispersing agent comprising an anionic polyelectrolyte, characterised in that the dispersing agent further comprises sufficient of a cationic polyelectrolyte to render the particles of filler cationic. Preferably, the filler and the dispersing agent are mixed vigorously.

When the filler is very fine, it is important that the anionic polyelectrolyte is added to the filler before the cationic polyelectrolyte. The order of addition is not so important when the particles of filler are coarse.

In preparing a suspension of a calcium-containing filler according to the process of the present invention, high speed mixing apparatus may be used without causing any substantial increase in the viscosity of the suspension. Thus, conventional mixing apparatus may be used without any detrimental effect on the properties of the suspension.

The calcium-containing filler employed in the present invention may be natural or synthetic. Preferred fillers are calcium carbonate, dolomite or calcium sulphate. It is believed that natural calcium carbonate, especially chalk in the raw state, is often contaminated on its surface by silica and humic acids so that although pure calcium carbonate has a small natural positive charge, the raw natural calcium carbonate has an overall negative charge on its surface. This raw natural calcium carbonate may be effectively deflocculated using a cationic dispersing agent if only gentle agitation is used, but vigorous agitation strips the silica and humic acids from the surface of the natural calcium carbonate leaving it once more positively charged. Under these conditions a cationic dispersing agent on its own is ineffective in dispersing the particles of calcium carbonate but the addition of a small quantity of an anionic dispersing agent in accordance with the present invention once more makes effective deflocculation possible even under conditions of vigorous agitation. It is believed that the anionic polyelectrolyte dispersing agent, each molecule of which carries a plurality of negative charges, forms electrochemical bonds with the positively charged sites on the surface of the calcium carbonate providing a negatively charged layer to which the cationic polyelectrolyte dispersing agent can bond.

In a further aspect of the present invention there is provided a paper-making composition comprising an aqueous suspension of a particulate calcium-containing filler according to the first aspect of the present invention, and cellulosic fibres.

Paper and cardboard are generally made by pouring an aqueous suspension of cellulosic fibres in the form of a pulp on to a wire mesh screen formed from a metal or a synthetic plastics material, and removing the water by drainage and/or other means such as suction, pressing and thermal evaporation. The cellulosic fibres are generally derived from wood which has been mechanically and chemically treated to form a pulp of fibrillated fibres which, when deposited on the wire mesh screen used for forming the paper or cardboard, interlock to form a web. Other sources of cellulosic fibres include sisal, esparto, hemp, jute, straw, bagasse, cotton linters and rags.

The addition of a calcium-containing filler to the cellulosic fibres improves the opacity, whiteness and ink receptivity of paper or cardboard which is formed from the fibres. The filler is also cheaper than the cellulosic fibres and therefore replacing some of the cellulosic fibres with the filler can result in a cheaper product.

The invention will now be illustrated by the following examples.

EXAMPLE 1

Aqueous suspensions were prepared of a natural chalk having a particle size distribution such that 43% by weight consisted of particles having an equivalent spherical diameter smaller than 2 microns, using as a cationic dispersing agent one of two preparations of poly(diallyl dimethyl ammonium chloride) having molecular weights of about 34,000 and about 62,000 respectively, with and without an anionic dispersing agent.

The suspensions were prepared using either:
1. hand mixing; or
2. "high intensity" mixing which consisted of hand mixing followed by high speed stirring by 23,500 revolutions of an impeller rotating at 1420 rpm.

When mixing was complete the suspension was allowed to stand for 10 minutes and the viscosity of the suspension was measured by means of a Brookfield Viscometer using Spindle No. 3 at a speed of 100 rpm. In the case of most of the suspensions the viscosity was measured again by the same method after the suspension had stood for a total of 60 minutes after the completion of mixing.

The results obtained are set forth in Table I below:

TABLE I

| Type of agitation | % by weight of cationic dispersing agent | % by weight of anionic dispersing agent | % by weight of solids | Viscosity (mPas) ater | |
|---|---|---|---|---|---|
| | | | | 10 mins | 60 mins |
| Hand mixing | 0.05 (A) | 0 | 65 | 3400 | 3500 |
| Hand mixing | 0.10 (A) | 0 | 65 | 115 | 182.5 |
| Hand mixing | 0.15 (A) | 0 | 65 | 90 | 95 |
| Hand mixing | 0.20 (A) | 0 | 65 | 85 | 85 |
| Hand mixing | 0.25 (A) | 0 | 65 | 80 | 80 |
| Hand mixing | 0.30 (A) | 0 | 65 | 80 | 80 |
| Hand mixing | 0.35 (A) | 0 | 65 | 85 | 85 |
| Hand mixing | 0.40 (A) | 0 | 65 | 87.5 | 87.5 |
| Hand mixing | 0.25 (B) | 0 | 70 | 135 | — |
| High intensity | 0.25 (B) | 0 | 61.4 | 5150 | — |
| High intensity | 0.30 (B) | 0.02 (C) | 70 | 95 | 125 |
| High intensity | 0.30 (B) | 0.02 (D) | 70 | 110 | 120 |

The cationic dispersing agents used were:
(A) poly(diallyl dimethyl ammonium chloride) having a number average molecular weight of 34,000.
(B) poly(diallyl dimethyl ammonium chloride) having a number average molecular weight of 62,000.

The anionic dispersing agents used were:

(C) a sodium polyacrylate dispersing agent having a number average molecular weight of 1680.

(D) a sodium salt of a copolymer of acrylic acid and a sulphonic acid derivative of acrylic acid, 10% of the total monomer units being the sulphonic acid derivatives.

In each case the percentage by weight of the dispersing agent was based on the weight of dry calcium carbonate.

It will be noted, firstly, that the optimum percentage by weight of the cationic dispersing agent for chalk was 0.25–0.30 and secondly, that in the absence of an anionic dispersing agent, a fluid suspension containing 70% by weight of calcium carbonate could be prepared using hand mixing, but that the use of high intensity mixing caused such a dramatic increase in viscosity that the suspension had to be diluted to 61.4% by weight of dry calcium carbonate in order to obtain a measurable value for the viscosity. The addition of 0.02% by weight, based on the weight of dry calcium carbonate, of an anionic dispersing agent enabled fluid suspensions containing 70% by weight of dry solids to be prepared even with high intensity mixing.

EXAMPLE 2

Aqueous suspensions were prepared of a ground natural marble having a particle size distribution such that 50% by weight consisted of particles having an equivalent spherical diameter smaller than 2 microns. In each case there were used different quantities of a poly(diallyl dimethyl ammonium chloride) dispersing agent having a number average molecular weight of 34,000 and no anionic dispersing agent. Each suspension contained 60% by weight of dry marble and was prepared by hand mixing. In each case the viscosity of the suspension was measured after standing for 10 minutes and 60 minutes after the completion of mixing.

The results obtained are set forth in Table II below:

TABLE II

| % by weight of cationic dispersing agent | Viscosity (mPas) after | |
| --- | --- | --- |
|  | 10 mins | 60 mins |
| 0.025 | 1440 | 1600 |
| 0.05 | 1340 | 1940 |
| 0.10 | 2100 | 2300 |
| 0.15 | 2300 | 2700 |
| 0.20 | 3100 | 3800 |

It will be noted that the optimum amount of the cationic dispersing agent for marble is 0.025–0.05% by weight.

Further aqueous suspensions were prepared of a ground natural marble having a particle size distribution such that 47% by weight consisted of particles having an equivalent spherical diameter smaller than 2 microns, using, as the dispersing agent, preparations of poly(diallyl dimethyl ammonium chloride) of varying molecular weights and the same anionic dispersing agents and the same mixing methods as has been described above in Example 1. In each case the viscosity of the suspension was measured after standing for 10 minutes and 60 minutes after the completion of mixing.

The results obtained are set form on Table III below:

TABLE III

| Type of agitation | % by weight of cationic dispersing agent | Molecular weight of cationic dispersing agent | % by weight of anionic dispersing agent | % by weight of solids | Viscosity (mPas) after | |
| --- | --- | --- | --- | --- | --- | --- |
|  |  |  |  |  | 10 mins | 60 mins |
| Hand mixing | 0.05 | 53000 | 0 | 65 | 200 | 320 |
| Hand mixing | 0.05 | 62000 | 0 | 65 | 145 | 210 |
| Hand mixing | 0.05 | 71750 | 0 | 65 | 210 | 315 |
| High mixing | 0.05 | 62000 | 0.01 (C) | 65 | 85 | 85 |
| High mixing | 0.05 | 62000 | 0.01 (D) | 65 | 90 | 70 |
| High intensity | 0.05 | 62000 | 0.01 (C) | 71 | 240 | 360 |
| High intensity | 0.05 | 62000 | 0.01 (D) | 70 | 90 | 105 |

It will be noted that the optimum molecular weight of the cationic dispersing agent is 62,000. In each case the "molecular weight" referred to above is the number average molecular weight.

Marble, unlike chalk, generally does not have a surface which is contaminated with silica and humic acids, and the surface, of particles of marble, is generally weakly positively charged. Deflocculation using a cationic dispersing agent alone is therefore ineffective even when hand mixing is used to prepare the suspension.

EXAMPLE 3

A batch of raw crushed marble was ground in an aqueous suspension containing 30% by weight of dry solids and in the absence of chemical dispersing agent, by means of a particulate grinding medium to yield a ground product having a particle size distribution such that 90% by weight of the particles had an equivalent spherical diameter smaller than 2 microns. The suspension of ground marble was dewatered by filtration in the absence of a flocculating agent and the filter cake was dried and pulverised in a laboratory hammer mill.

Samples of the finely ground marble powder were mixed with water to form a suspension containing 60% by weight of dry solids and varying quantities of an anionic and of a cationic dispersing agent. The anionic dispersing agent was the same sodium polyacrylate dispersing agent (C) as was used in Example 1 and the cationic dispersing agent was a poly (diallyl dimethyl ammonium chloride) having a number average molecular weight of about 50,000.

In each experiment the anionic dispersing agent was added first to the suspension of ground marble and the mixture stirred by 9,400 revolutions of an impeller rotating at 1,420 rpm. The cationic dispersing agent was then added and the mixing procedure was repeated. The viscosity was measured immediately on completion of the second mixing procedure by means of a Brookfield Viscometer.

The results obtained are set forth in Table IV below:

TABLE IV

| Total % by wt. of mixed dispersing agents | % by wt. of anionic dispersing agent | % by wt. of cationic dispersing agent | Wt. ratio cationic:anionic | Viscosity (mPa.s) |
| --- | --- | --- | --- | --- |
| 0.416 | 0.053 | 0.363 | 6.9 | 10,000 |
| 0.642 | 0.082 | 0.560 | 6.9 | 4,600 |
| 0.850 | 0.108 | 0.742 | 6.9 | 106 |
| 1.03 | 0.131 | 0.899 | 6.9 | 82 |
| 1.29 | 0.164 | 1.13 | 6.9 | 78 |
| 2.07 | 0.263 | 1.81 | 6.9 | 480 |
| 0.348 | 0.070 | 0.278 | 4.0 | 9,400 |
| 0.504 | 0.101 | 0.403 | 4.0 | 3,600 |
| 0.616 | 0.123 | 0.493 | 4.0 | 60 |
| 0.800 | 0.160 | 0.640 | 4.0 | 74 |
| 1.02 | 0.204 | 0.816 | 4.0 | 576 |
| 1.28 | 0.256 | 1.02 | 4.0 | 2,400 |
| 0.364 | 0.102 | 0.262 | 2.6 | 3,600 |
| 0.570 | 0.159 | 0.511 | 2.6 | 1,800 |
| 0.732 | 0.205 | 0.527 | 2.6 | 3,400 |
| 0.910 | 0.254 | 0.656 | 2.6 | 4,350 |
| 1.05 | 0.294 | 0.756 | 2.6 | 4,650 |
| 1.60 | 0.447 | 1.15 | 2.6 | 4,150 |
| 0.145 | 0.053 | 0.092 | 1.7 | 10,000 |
| 0.273 | 0.100 | 0.173 | 1.7 | 6,150 |
| 0.351 | 0.129 | 0.222 | 1.7 | 3,360 |
| 0.434 | 0.160 | 0.274 | 1.7 | 7,600 |
| 0.541 | 0.199 | 0.342 | 1.7 | 7,900 |
| 0.790 | 0.291 | 0.499 | 1.7 | 5,900 |
| 1.26 | 0.464 | 0.796 | 1.7 | 6,000 |

These results show that the optimum dispersion was obtained when the ratio of the weight of cationic dispersing agent to the weight of anionic dispersing agent was about 4:1. When the ratio was increased to 6.9:1 it was still possible to obtain a very fluid suspension but at the expense of a slightly higher dose of mixed dispersing agents.

EXAMPLE 4

A further experiment was performed using the same finely ground marble powder and the same experimental procedure as described in Example 3. The suspension containing 60% by weight of dry marble powder was mixed with 0.16% by weight of sodium polyacrylate dispersing agent (C) and then with 0.63% by weight of a poly (diallyl dimethyl ammonium chloride) of number average molecular weight about 10,000 (the ratio of the weight of cationic dispersing agent to the weight of anionic dispersing agent was 4:1). Both the percentages by weight are the percentage by weight of the dry dispersing agent based on the weight of dry marble. The viscosity on completion of mixing was found to be 74 mPa.s.

EXAMPLE 5

A further experiment was performed using the same finely ground marble powder and the same anionic and cationic dispersing agents as were described in Example 3. In this case, however, a mixture consisting of 0.12% by weight of the anionic dispersing agent and 0.50% by weight of the cationic dispersing agent was added to the suspension of marble powder and the mixture stirred by 18,000 revolutions of the impeller rotating at 1,420 rpm. Both percentages by weight are the percentage by weight of the dry dispersing agent based on the weight of dry marble. The viscosity of the suspension on completion of mixing was found to be 2,060 mPa.s. This shows the importance of mixing the anionic dispersing agent with the marble suspension before the cationic dispersing agent is introduced.

EXAMPLE 6

Further experiments were performed using the same finely ground marble powder and the same experimental procedure as described in Example 3. The same anionic dispersing agent (C) was used but the cationic dispersing agent was a poly (diallyl dimethyl ammonium chloride) having a number average molecular weight of about 3,000 to 5,000. Samples of the finely ground marble were mixed with water to form a suspension containing 60% by weight of dry solids and varying quantities of an anionic and cationic dispersing agents. The viscosity measurements obtained are set forth in Table V below:

TABLE V

| % by wt. of mixed dispersing agents | % by wt. of anionic dispersing agent | % by wt. of cationic dispersing agent | Wt. ratio cationic:anionic | Viscosity (mPa.s) |
| --- | --- | --- | --- | --- |
| 0.41 | 0.052 | 0.358 | 6.9 | 10,000 |
| 0.88 | 0.112 | 0.768 | 6.9 | 4,800 |
| 1.17 | 0.149 | 1.02 | 6.9 | 1,900 |
| 1.59 | 0.202 | 1.39 | 6.9 | 2,320 |
| 0.253 | 0.051 | 0.202 | 4.0 | 10,000 |
| 0.521 | 0.104 | 0.417 | 4.0 | 2,200 |
| 0.69 | 0.138 | 0.552 | 4.0 | 1,320 |
| 1.107 | 0.221 | 0.886 | 4.0 | 2,300 |
| 0.178 | 0.050 | 0.128 | 2.6 | 10,000 |
| 0.336 | 0.094 | 0.242 | 2.6 | 2,840 |
| 0.510 | 0.143 | 0.367 | 2.6 | 3,300 |
| 0.724 | 0.202 | 0.522 | 2.6 | 4,150 |

These results show that a poly (diallyl dimethyl ammonium chloride) dispersing agent having a number average molecular weight in the range of 3000 to 5000 gives a less fluid suspension of finely ground marble than a poly (diallyl dimethyl ammonium chloride) dispersing agent having a number average molecular weight of about 10,000 or more.

EXAMPLE 7

A first aqueous suspension (A) was prepared containing 70% by weight of the same natural chalk as was used in Example 1 and, as dispersing agents, a mixture of 0.1% by weight of sodium polyacrylate dispersing agent (C) and 0.7% by weight of a cationic polymer having a number average molecular weight of 70,000 and repeating units represented by the formula:

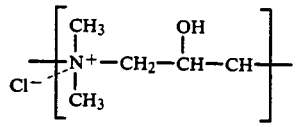

Both percentages were the percentage by weight of dry polymer based on the weight of dry chalk.

A second aqueous suspension (B) was prepared containing 65% by weight of the same ground marble as was used in Example 2 and, as dispersing agents, a mixture of 0.01% by weight of the same anionic polymer and 0.2% by weight of the same cationic polymer as were used for suspension A above.

Each suspension was subjected to high intensity mixing by 23,500 revolutions of an impeller rotating at 1,420 rpm after which the viscosity of each suspension was measured by means of the Brookfield Viscometer. The results obtained are set forth in Table VI below:

TABLE VI

| Suspension | % by wt. of anionic dispersing agent | % by wt. of cationic dispersing agent | Viscosity (mPa.s) |
|---|---|---|---|
| A | 0.1 | 0.7 | 1200 |
| B | 0.01 | 0.2 | 545 |

EXAMPLE 8

Two further portions of the same ground natural marble as was used in Example 2 were mixed with water using high intensity mixing to form a suspension containing 70% by weight of dry marble, there being used as the dispersing agent in each case:

(i) 0.14% by weight, based on the weight of dry marble, of sodium polyacrylate dispersing agent (C); and (ii) a mixture consisting of 0.1% by weight of a poly(diallyl dimethyl ammonium chloride) having a number average molecular weight of 50,000 and 0.01% by weight of dispersing agent (C), both percentages by weight being based on the weight of dry marble.

In suspension (i) the marble particles had an overall negative charge and in suspension (ii) an overall positive charge.

Samples of each of the two suspensions were added to portions of an aqueous suspension containing 0.3% by weight of a bleached sulphite cellulosic paper pulp which had been beaten to 300 Canadian standard freeness in portions such that there was present 80% by weight of marble particles based on the weight of dry paper pulp.

There were added to the samples of the suspensions of mixed paper pulp and marble different quantities of a polyacrylamide retention aid, the retention aid used with samples containing suspension (i) bearing a net positive charge and the retention aid used with samples containing suspension (ii) bearing a net negative charge. To one sample containing each of suspension (i) and suspension (ii) there was also added a quantity of a cationic starch.

Each sample was tested for retention in the paper pulp in a Britt dynamic retention jar (see Mechanisms of Retention During Paper Formation by K. W. Britt, TAPPI, Vol. 56, No. 10, October 1973, pages 46–50). In this apparatus the liquid component and unattached fine particles in the suspension drain through a piece of papermaking wire screen while the suspension is maintained in continuous turbulent movement by means of a mechanical stirrer. The percentage of the initial weight of dry marble particles which is retained in the paper pulp was measured for each suspension sample at stirrer speeds of 1050 rpm and 1700 rpm respectively and the results are set forth in Table VII below:

TABLE VII

| Suspension | % by weight of retention aid | % by weight of cationic starch | % by weight at stirrer speed 1050 rpm | % by weight at stirrer speed 1700 rpm |
|---|---|---|---|---|
| (i) | 0 | 0 | 2.8 | 1.0 |
| (i) | 0.02 | 0 | 21.2 | 15.9 |
| (i) | 0.03 | 0 | 35.6 | 20.1 |
| (i) | 0.04 | 0 | 47.4 | 26.1 |
| (i) | 0.02 | 0.4 | 43.9 | 20.3 |
| (ii) | 0 | 0 | 17.3 | 14.0 |
| (ii) | 0.02 | 0 | 44.4 | 18.6 |
| (ii) | 0.02 | 0.4 | 52.9 | 24.0 |

These results show that when the marble was prepared in accordance with the invention (suspension (ii)) the retention of the filler in the paper pulp was better both in the absence of a retention aid and in the presence of equal quantities of a retention aid than in the case in which the marble was prepared using a conventional anionic dispersing agent (suspension (i)). The retention of the filler for suspension (ii) in the absence of a retention aid was approximately equivalent to that obtained with suspension (i) in the presence of 0.02% by weight of retention aid.

We claim:

1. A paper-making process in which the retention of a marble filler in the web of fibers is maintained, while permitting a reduction in the amount of retention aid required, said process comprising the step of introducing a paper-making composition comprising cellulosic fibers and the marble filler onto a paper-making screen to deposit a web of cellulosic fibers having retained therein marble particles, with the liquid component of the paper-making composition containing unattached fine particles in suspension draining through the screen; said paper-making composition being prepared by combining an aqueous suspension of a particulate marble filler comprising at least 60% of the filler, the particles of the filler being dispersed with a dispersing agent comprising (i) from about 0.01% to about 0.2% by weight based on the weight of dry marble filler, of an anionic polyelectrolyte selected from the group consisting of a poly(acrylic acid), a poly(methacrylic acid), a partially sulphonated poly(acrylic acid) or a partially sulphonated poly(methacrylic acid) or an alkali metal or ammonium salt of any of these acids, and (ii) from about 0.01% to about 1.5% by weight based on the weight of dry marble filler, of a cationic polyelectrolyte selected from the group consisting of: poly(diallyl di(hydrogen or lower alkyl) ammonium salt) and the product of co-polymerizing epichlorohydrin and an aliphatic secondary amine; and said cationic polyelectrolyte being present in an amount sufficient to render the particles of marble filler cationic.

2. A process according to claim 1, wherein the cationic polyelectrolyte is a poly (diallyl di(hydrogen or lower alkyl) ammonium salt) having a number average molecular weight in the range of from 10,000 to 100,000.

3. A process according to claim 1, wherein the cationic polyelectrolyte is the product of co-polymerizing epichlorohydrin and an aliphatic secondary amine.

4. A process according to claim 1, wherein the ratio of the weight of the cationic polyelectrolyte to the weight of the anionic polyelectrolyte is in the range of from 2:1 to 20:1.

* * * * *